(12) United States Patent
Francisquini

(10) Patent No.: US 12,348,011 B2
(45) Date of Patent: Jul. 1, 2025

(54) SINUSOIDAL TUBULAR CONDUCTING BUSBAR

(71) Applicant: Melquisedec Francisquini, Sao Paulo II (BR)

(72) Inventor: Melquisedec Francisquini, Sao Paulo II (BR)

(*) Notice: Subject to any disclaimer, the term of this patent is extended or adjusted under 35 U.S.C. 154(b) by 483 days.

(21) Appl. No.: 17/798,756

(22) PCT Filed: Feb. 11, 2021

(86) PCT No.: PCT/BR2021/050065
§ 371 (c)(1),
(2) Date: Aug. 10, 2022

(87) PCT Pub. No.: WO2021/159196
PCT Pub. Date: Aug. 19, 2021

(65) Prior Publication Data
US 2023/0109751 A1    Apr. 13, 2023

(30) Foreign Application Priority Data
Feb. 14, 2020 (BR) .................. 102020003216-0

(51) Int. Cl.
*H02B 1/20* (2006.01)
*H01B 5/02* (2006.01)
*H02G 5/10* (2006.01)

(52) U.S. Cl.
CPC .............. *H02B 1/20* (2013.01); *H01B 5/02* (2013.01); *H02G 5/10* (2013.01)

(58) Field of Classification Search
CPC ............ H02B 1/20; H01B 5/02; H02G 5/10

USPC ......................................... 439/111
See application file for complete search history.

(56) References Cited

U.S. PATENT DOCUMENTS

| | | | |
|---|---|---|---|
| 5,202,818 A * | 4/1993 | Betsch | H02B 1/301 361/829 |
| 6,231,142 B1 * | 5/2001 | Pochet | H02B 1/308 312/265.3 |
| 7,441,847 B2 * | 10/2008 | Francisquini | H02B 1/308 312/265.3 |
| 7,794,132 B2 * | 9/2010 | Cunius | F21V 21/002 362/241 |
| 12,107,398 B2 * | 10/2024 | Francisquini | A47B 47/03 |

(Continued)

FOREIGN PATENT DOCUMENTS

BR    102018068113 A2    9/2018

*Primary Examiner* — Harshad C Patel
(74) *Attorney, Agent, or Firm* — Cowan, Liebowitz & Latman, P.C.; Mark Montague

(57) ABSTRACT

"SINUSOIDAL TUBULAR CONDUCTING BUSBAR" refers to an electric conductor busbar, more specifically a conductor busbar, with a sinusoidal tubular shape, applied to electric cabinets to control and switchgear assemblies for low and high voltage and prefabricated power lines. The busbar has an initial crimping tab connecting to a first sinusoid, which in turn connects to a junction tab, which in turn connects to a second sinusoid, so that said first sinusoid and second sinusoid form a tubular region between them, wherein there is no contact between said first sinusoid and second sinusoid. Said second sinusoid is connected to a final crimping or even a second junction tab, which is connected to a third sinusoid, with the said third sinusoid being connected to a final crimping tab.

17 Claims, 4 Drawing Sheets

(56) References Cited

U.S. PATENT DOCUMENTS

| | | | | |
|---|---|---|---|---|
| 2003/0172613 A1* | 9/2003 | Fontana | ................ | H02B 1/306 |
| | | | | 52/282.1 |
| 2008/0112169 A1* | 5/2008 | Cunius | ................ | F21V 21/002 |
| | | | | 362/249.07 |
| 2010/0178455 A1* | 7/2010 | Shen | ................ | H02B 1/01 |
| | | | | 428/134 |
| 2018/0116400 A1* | 5/2018 | Lu | ................ | H05K 7/1488 |

\* cited by examiner

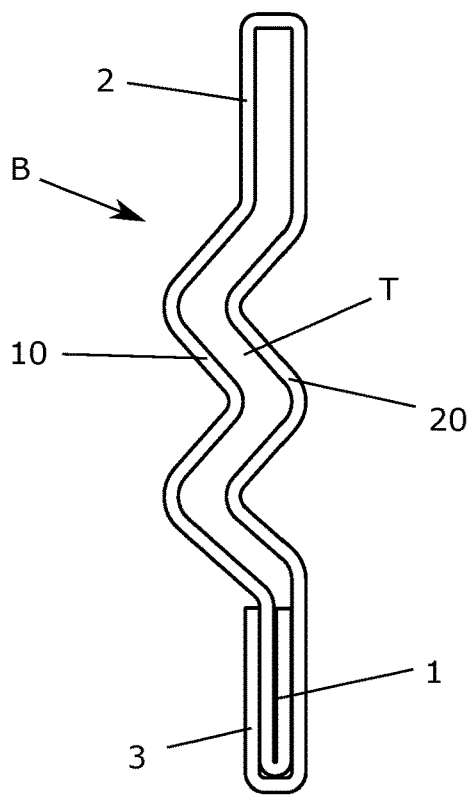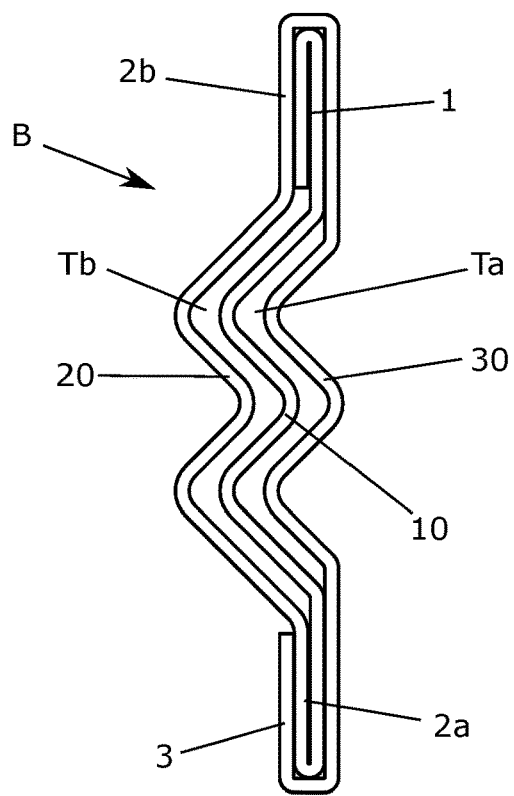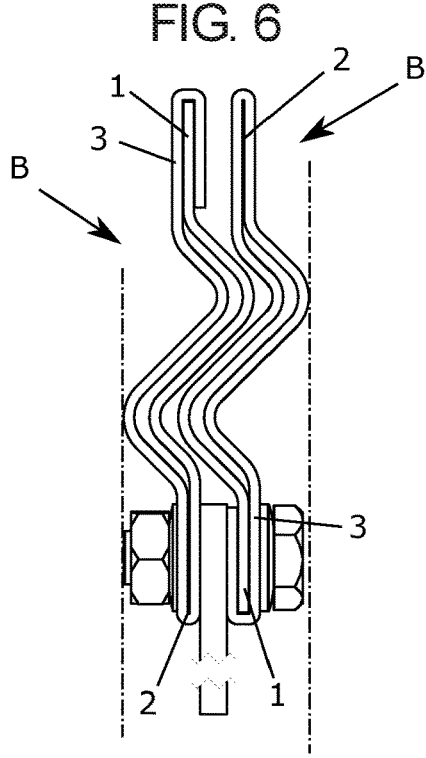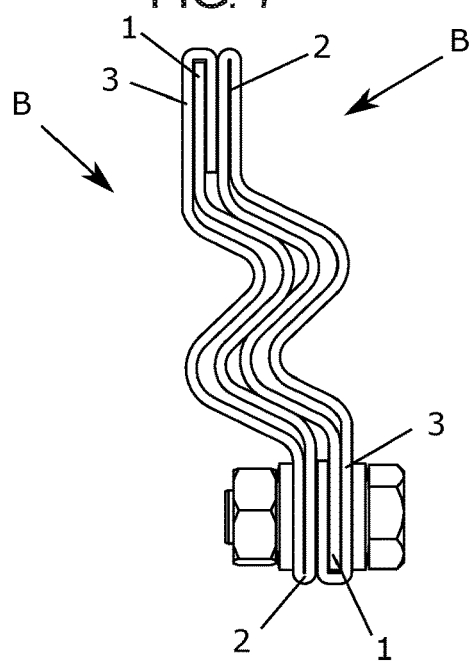

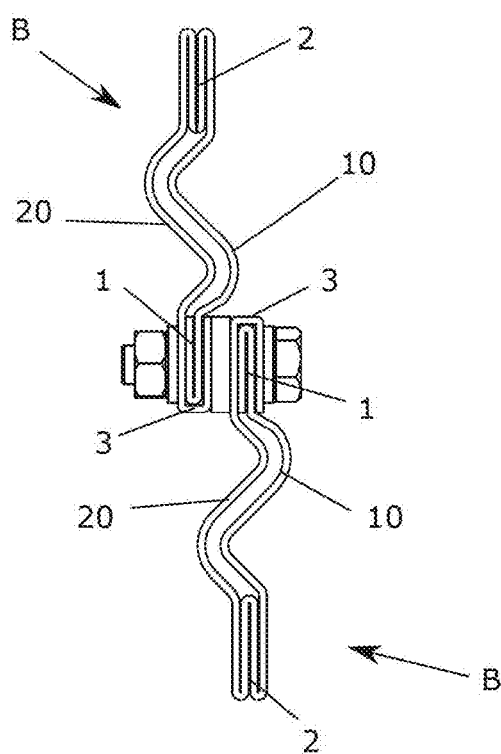
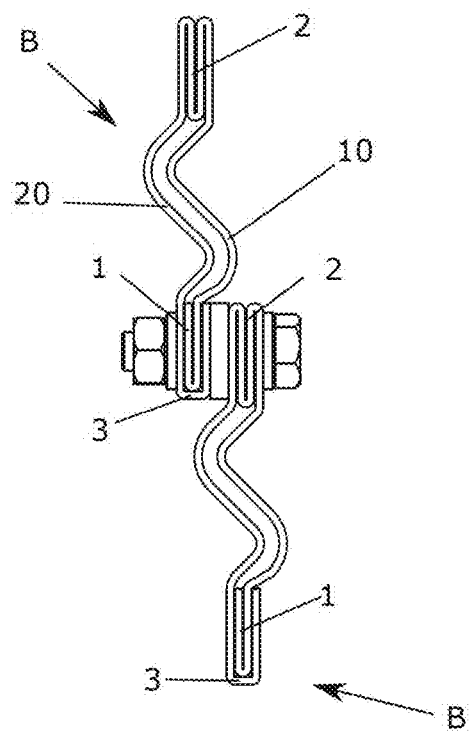
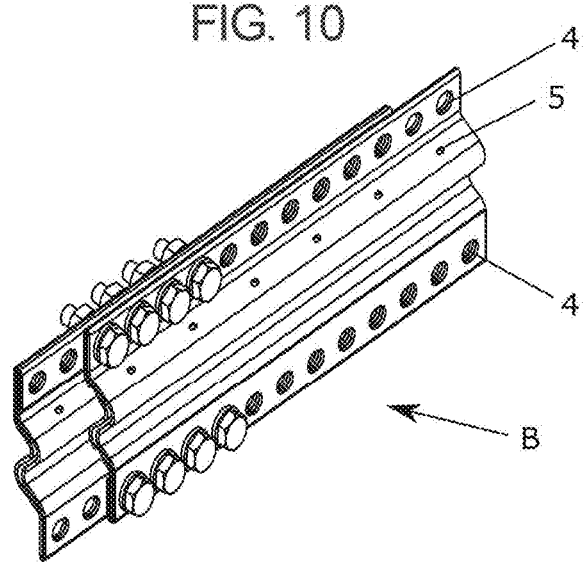

SINUSOIDAL TUBULAR CONDUCTING BUSBAR

TECHNICAL FIELD

The present invention refers to an electric conducting busbar, more specifically a conducting busbar, with sinusoidal, tubular shape, applied to electric cabinets to control and switchgear assemblies for low and high voltage power and prefabricated power lines.

BACKGROUND OF THE INVENTION

Low and high voltage control and switchgear assemblies are essential for any electrical installation in all sectors of economic activity. Such assemblies are intended for use together with equipment designed for the generation, transmission, distribution and conversion of electric power and for the control of equipment consuming electric power. These assemblies consist of an electric cabinet, functional units where individual devices are installed, and the busbar system.

The busbar system is a low impedance conductor to which several electrical circuits can be connected separately. The function of which is to conduct electric power among several points in an assembly, and its sizing must be carried out considering the following factors:
  a) The temperature rise caused by the electron flow in normal use situation, wherein such temperature rise is related to the choice of the material used;
  b) Thermal and dynamic stresses caused by unusual situations such as voltage and current spikes, short circuits and accidental electric arcs;
  c) Leakage currents caused by the proximity among conductors and between the conductors and metallic parts of electric cabinets; and
  d) The quantity and way connections and derivations are made.

Given these intrinsic characteristics of electric busbars, they are almost entirely made of copper bars, with a rectangular cross section, since copper has good electrical conductivity, having a relatively low manufacturing cost compared to other conductive materials such as silver and gold.

The conductor busbars, when subjected to high values of alternating current, suffer a great incidence of the skin effect, that is, the useful area for conducting electricity is reduced, since the alternating current tends to be concentrated in the periphery of the conductor, decreasing the current density inside it.

As a consequence of such skin effect, more material is used in the production of the solid busbars, thus increasing its cross-sectional area in order to guarantee a conductor with low apparent electrical resistance, which reduces the negative effects of the skin effect resulting in a more effective busbar.

Bars with a rectangular and solid profile are used practically in all copper busbars applications in electric cabinets, and such configuration is usually found in varying sizes such as 100×10 mm, 80×10 mm, 50×10 mm, among others.

Busbars in other formats are also used, an example is the one disclosed in document BR 10 2018 068113-3 filed on Sep. 6, 2018, with the aim of increasing the perimeter improving heat dissipation and reducing losses caused by the skin effect, enhancing the current density in the material for high currents, allowing, thus, the use of less material to made it. Despite such improvement, even so, in this and in other configurations seeking to take advantage of the gains obtained by increasing its perimeter, in systems where 2 or more conductors are used per phase, losses caused by a phenomenon whose principle is the same as skin effect are also generated; however, like the interaction occurring among different conductors, the phenomenon is called proximity effect.

In this way, the prior art would benefit from a profile whose embodiment allows the use of less material, presents such a shape that, through the transposition and inversion of the possible paths traveled by the electromagnetic field, there is an attenuation of the proximity effect, and thereby the same electrical current capacity as the current profiles is able to be achieved.

BRIEF DESCRIPTION OF THE INVENTION

The present invention discloses a busbar built in a sinusoidal tubular shape, with a setting that has mechanical resistance compatible with solid conductive busbars, but with greater conducting efficiency when increasing the conductor perimeter if compared to conventional systems, then obtaining an greater area for heat dissipation; combined with this, it also takes advantage of the skin effect and the proximity effect, which results in the reduction of the cross section increasing the current density in the conductor, in addition to enhancing the space occupied by it and consequently the possibility of assembling several busbars together to increase the supported current capacity.

An objective of the present invention is to provide a busbar capable of conducting a greater electric current with less material.

Another objective of the present invention is to provide a busbar that makes it possible to increase the perimeter, improving the heat dissipation of the conductor.

It is also the objective of the present invention to provide a busbar that improves the use of the skin effect when using a tubular shape, with less material in the internal area of the conductor.

Another objective of the present invention is to provide a busbar allowing the assembly of a system with two or more conductors per phase, in a such way the electromagnetic field generated by the proximity effect is attenuated, improving the current balance between 2 conductors of a same phase.

Another objective of the present invention is to provide a busbar having an excellent mechanical resistance to withstand the dynamic stresses to which a busbar is subjected, either in normal work situations or in stress situations, for example in a short circuit.

It is also an objective of the present invention to provide a busbar that improves the heat exchange, enhancing its cooling and consequently the electrical conductivity.

Finally, another objective of the present invention is to provide a busbar leading to optimization of the space occupied by it.

BRIEF DESCRIPTION OF THE DRAWINGS

The subject matter of this specifications will be totally evident in its technical aspects from the detailed description that will be made based on the figures listed below, in which:

FIG. 4 shows a side view of an embodiment of the busbar in a single folded sheet, wherein the sinusoid is M-shaped, wherein the junction and final crimping tabs are aligned at the same plane, and wherein the initial crimping tab has a double layer, and the junction tab is spaced between its sides;

FIG. 5 shows a side view of an embodiment of the busbar in single folded sheet, wherein three M-shaped sinusoids are used, wherein the initial crimping tab has two layers, and two junction tabs with two layers are used;

FIG. 6 shows a side view of the two busbars assembly, as shown in FIG. 1, wherein there is no contact between the two busbars and the fastening elements are within the area occupied by the busbar;

FIG. 7 shows a side view of the two busbars assembly, as shown in FIG. 2, wherein there is contact between the two busbars, and wherein the initial crimping and junction tabs are parallel and at different planes;

FIG. 8 shows a side view of the two busbars assembly, as shown in FIG. 3, wherein both busbars are fixed by the final and initial crimping tab and the busbars are displaced laterally with each other;

FIG. 9 shows a side view of the two busbars assembly, as shown in FIG. 3, wherein one of the busbars is fixed by the final and initial crimping tabs and the other busbar is fixed by the junction tab, and the busbars are displaced laterally with each other;

FIG. 10 shows a perspective view of a two busbars assembly assembled aligned, wherein one may observe the fixing holes and the cooling holes.

DETAILED DESCRIPTION OF THE INVENTION

Figure 1:
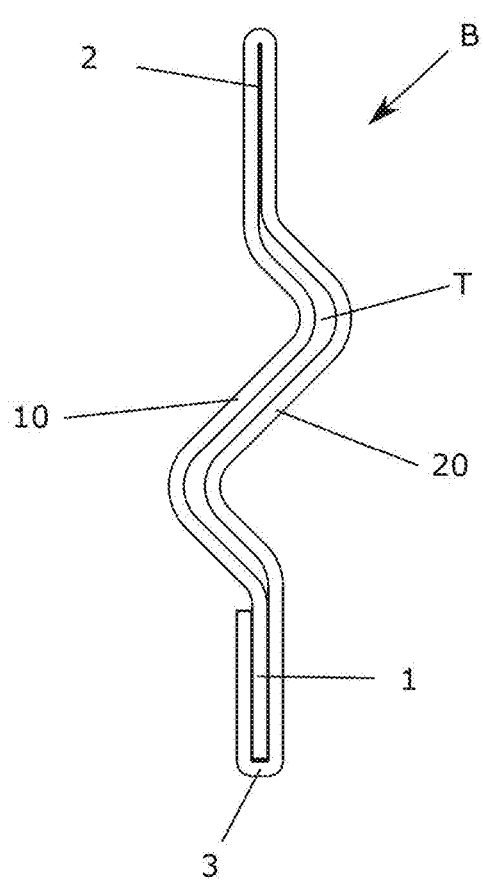
FIG. 1 shows a side view of an embodiment of the busbar in a single folded sheet, wherein the initial crimping and junction tabs are aligned at the same plane and in which said initial crimping tab has a single layer.

In accordance with the aforementioned figures, the present invention "SINUSOIDAL TUBULAR CONDUCTING BUSBAR" consists of a busbar (B) having an initial crimping tab (1) connecting to a first sinusoid (10), which in turn connects to a junction tab (2), which in turn connects to a second sinusoid (20), so that the said first sinusoid (10) and the second sinusoid (20) form a tubular region (T) between them, wherein there is no contact between the said first sinusoid (10) and the second sinusoid (20). Said second sinusoid (20) can be connected to a second junction tab (2b) or the final crimping flap (3).

Figure 2:
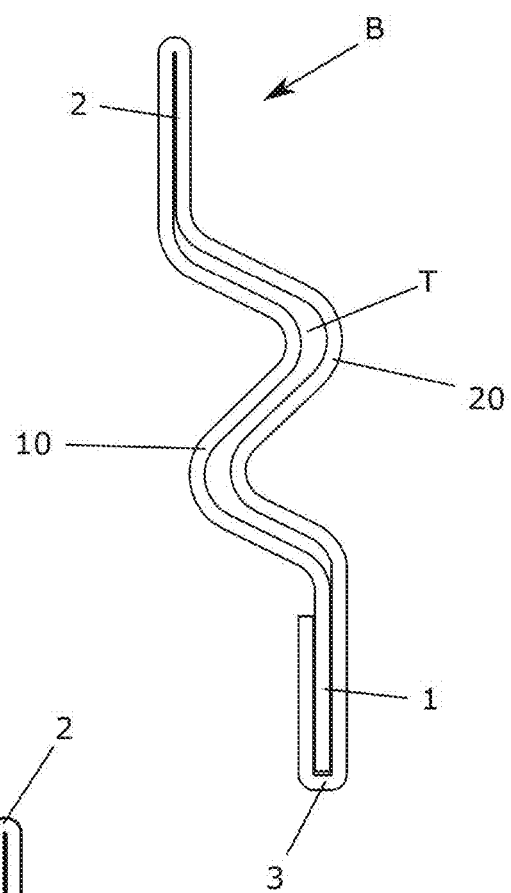
FIG. 2 shows a side view of an embodiment of the busbar in a single folded sheet, wherein the initial crimping and junction tabs are parallel and at different planes, and the said initial crimping tab has a single layer.
Figure 3:
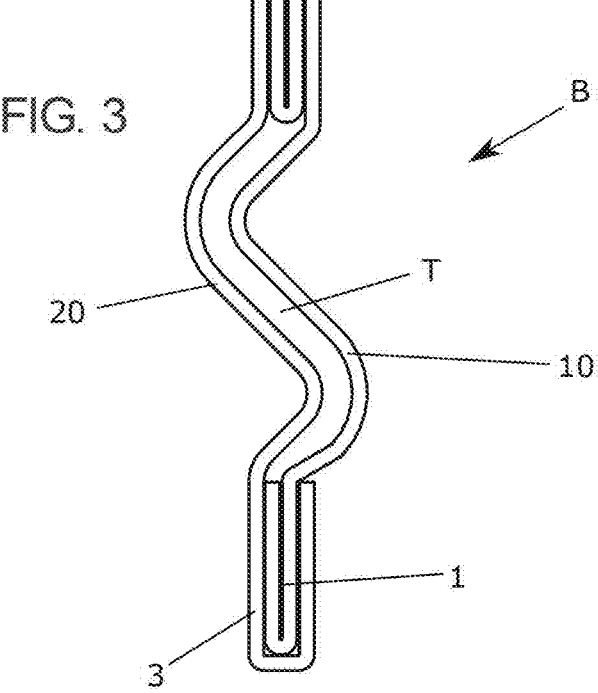
FIG. 3 shows a side view of an embodiment of the busbar in a single folded sheet, wherein the junction and final crimping tabs are aligned at the same plane, wherein the initial crimping tab has a double layer, and the junction tab has triple layer.
Figure 11:
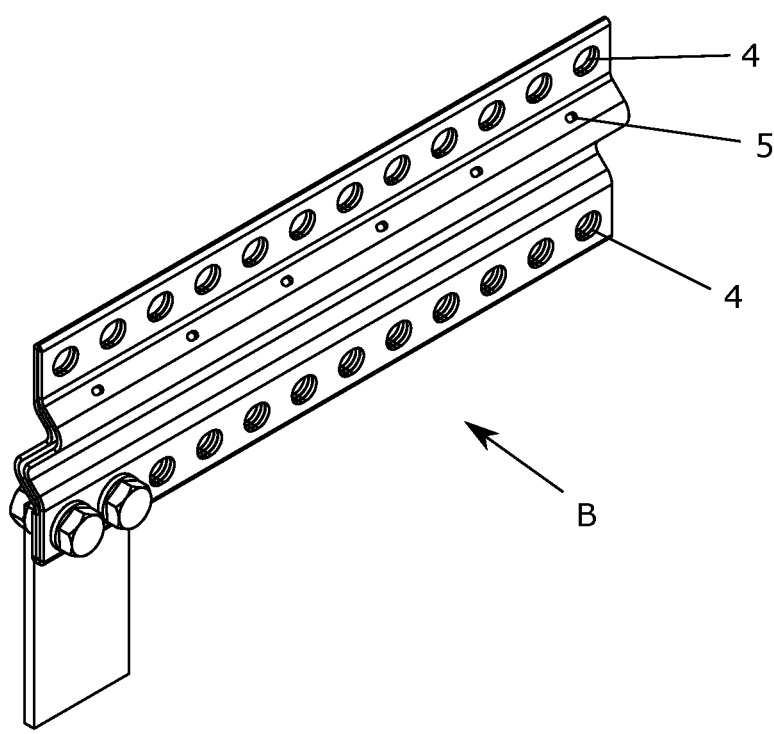
FIG. 11 shows a perspective view of busbar with a connection element attached to it, wherein one may observe the fixing holes and the cooling holes.

The initial crimping (1) is a flat portion connecting to the first sinusoid (10), and can also comprise a single layer, as seen in FIGS. 1 and 2, or more than one layer so that there are one or more folds of 180°, according to FIGS. 3, 4 and 5, wherein it is possible to observe an example of initial crimping (1) with a 180° fold forming two layers.

The junction tab (2) connects the first sinusoid (10) to the second sinusoid (20). The referred junction tab (2) has two or more flat regions and can have one or more 180° folds. An example of a junction tab (2) with a 180° fold forming two layers is seen in FIGS. 1 and 2. In FIG. 3 it is possible to note a junction tab with three 180° folds forming four layers. Additionally, the junction tab (2) can have its layers separated, as seen in FIG. 4, wherein a two-layer junction tab (2) being spaced between them is shown. For conductor busbars (B) with three or more sinusoids, more than one junction tab (2) is used, as shown in FIG. 5 showing an example that has two junction tabs (2a and 2b), wherein said junction tab (2b) connects the second sinusoid (20) to the third sinusoid (30).

The final crimping tab (3) closes the profile and may involve the initial crimping tab (1) or the junction tab (2). FIGS. 1 to 4 show examples of the final crimping tab (3) involving an initial crimping tab (1), and FIG. 5 shows the final crimping tab (3) involving a junction tab (2a).

The surfaces of the junction tab (2) and final crimping tab (3) can be aligned, that is, at the same plane. They can be in parallel planes, that is, misaligned, or they can also be in secant planes in order to facilitate assembly in specific cases. FIGS. 1, 3, 4 and 5 show examples of junction tab (2) and final crimping tab (3) aligned, and FIGS. 2 and 7 show an example wherein said tabs are in parallel planes.

The first sinusoid (10) and the second sinusoid (20) form the tubular region (T), which is generated by the separation of the two sinuses, which do not touch each other. Additionally, there may be more than two sinusoids, as shown in FIG. 5, wherein there is the third sinusoid (30), which form two tubular regions (Ta and Tb). The sinusoids form the curved region of the conductor busbar (B) and may have a shape close to a sinewave itself, as shown in FIGS. 1, 2 and 3 or different wave shapes. FIGS. 4 and 5 show sinusoidal shapes similar to letter "M".

Busbar (B) can contain fixing holes (4) along the initial crimping tab (1), final crimping tab (3) and junction tab (2). Such holes aid the assembly, eliminate extra weight and save material.

Cooling holes (5) can be inserted along the sinusoid, wherein the said holes aid the air circulation into the tubular region (T), contributing to the cooling of the busbar (B). The hot air convection contacting the busbar produces an air flow that, with the cooling holes, enhances the air exchange with the busbar (B), contributing to [sic].

For facilities requiring an electrical current greater than the busbar (B) conducting capacity, it is possible to assembly with more than one busbar (B). FIGS. 6, 7 and 10 show assemblies wherein the busbars (B) are laterally aligned, in this type of assembly, the busbars (B) may be spaced apart, as seen in FIG. 6, or it may still contact as seen in the FIGS. 7 and 10. Additionally, the busbars (B) can be mounted without displacement, as shown in FIGS. 8 and 9.

In a preferred embodiment, the busbar (B) is made of a single folded, weld-free sheet.

The multiple layer areas should preferably contain an electrical insulator between them to prevent an electric arc from forming due to a small distance that can occur between the layers.

The sinusoidal tubular shape of the busbar (B) reduces the occurrence of the skin effect, and makes the apparent current reached in the busbar (B) closer to the rated current calculated for a busbar in the same cross-sectional area.

When the busbar (B) has the initial crimping tab (1) and junction tab (2) aligned, it is possible to mount a busbars assembly (B) with no fixing screws exceeding the area occupied by the busbars (B), as seen in FIG. 6, aiding to save space inside the electric cabinet wherein the busbar (B) is assembled.

The busbar (B) stands out from the other electric busbars disclosed in the prior art mainly due to the fact that it has a sinusoidal tubular assembly, while the other busbars have solid or closed tubular assembly. Therefore, the busbar (B) provides a significant saving of conductive material in its assembly, reducing its production cost and the impact to the natural reserves of the elements used in its assembly, such as copper, aluminum, gold and silver.

Another advantage of the busbar (B) relates to its high mechanical strength, since it has an assembly based on curved walls increases the mechanical strength compared to solid rectangular busbars, providing, thus, minimum deformation when exposed to the tests of high-level short circuit.

Finally, another advantage of the busbar (B) is that the assembly in its applications is substantially easier compared to the solid busbars, since it has a series of holes options facilitating the fixation, extension and bypass operations.

It should be understood the present specification does not limit the application to the details described herein and the invention is capable of other embodiments and should be practiced or performed in a variety of ways, within the scope of the claims. Although specific terms have been used, these terms should be construed in a generic and descriptive sense, and not for the purpose of limitation.

The invention claimed is:

1. A SINUSOIDAL TUBULAR CONDUCTING BUSBAR applied to electric cabinets to command and switchgear assemblies for low and high voltage power and prefabricated power lines, comprising: an initial crimping tab having at least two layers, the initial crimping tab connecting to a first sinusoid, which in turn connects to a junction tab, which in turn connects to a second sinusoid, forming a tubular region between the first sinusoid and second sinusoid; and said second sinusoid is connected to a final crimping.

2. The BUSBAR according to claim 1, wherein said second sinusoid is connected to a second junction tab, which in turn connects to a third sinusoid, forming a tubular region between the first sinusoid and the third sinusoid; said third sinusoid is connected to the final crimping.

3. The BUSBAR according to claim 2, wherein surfaces of both junction tabs and the final crimping are in secant planes.

4. The BUSBAR according to claim 1, wherein the initial crimping is flat.

5. The BUSBAR according to claim 1, wherein the junction tab has two layers.

6. The BUSBAR according to claim 1, wherein the junction tab has three or more layers.

7. The BUSBAR according to claim 1, wherein the layers of the junction tab will be joined.

8. The BUSBAR according to claim 1, wherein there is a gap between layers of the junction tab.

9. The BUSBAR according to claim 1, wherein the final crimping tab involves the initial crimping tab.

10. The BUSBAR according to claim 1, wherein the final crimping tab involves one of the junction tabs.

11. The BUSBAR according to claim 1, wherein surfaces of the junction tab and the final crimping are at the same plane.

12. The BUSBAR according to claim 1, wherein surfaces of the junction tab and the final crimping are in parallel planes.

13. The BUSBAR according to claim 1, wherein the sinusoids have a sinewave shape.

14. The BUSBAR according to claim 1, wherein the sinusoids have an "M" shape.

15. The BUSBAR according to claim 1, wherein the busbar has fixing holes along at least one outer edge.

16. The BUSBAR according to claim 1, wherein the busbar has cooling holes along at least one sinusoid.

17. The BUSBAR according to claim 1, wherein the busbar is made of a single folded, weld-free sheet.

* * * * *